United States Patent Office 3,728,136
Patented Apr. 17, 1973

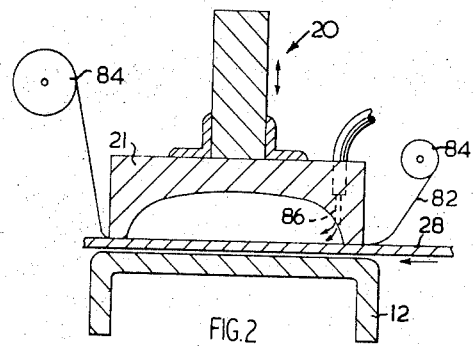
FIG.2
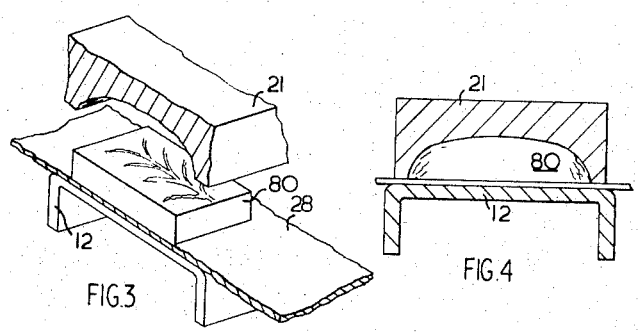
FIG.3
FIG.4
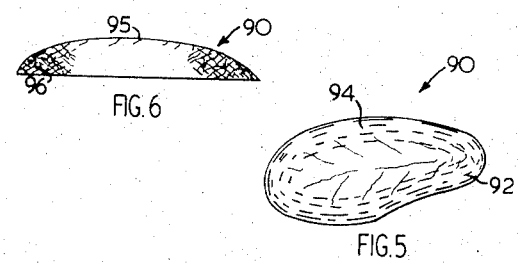
FIG.6
FIG.5

3,728,136
PROCESS AND APPARATUS FOR SHAPING
FROZEN FLESH
Ian H. Langlands, Halifax, Nova Scotia, Canada, assignor
to National Sea Products Limited, Halifax, Nova Scotia,
Canada
Filed Feb. 19, 1970, Ser. No. 12,567
Claims priority, application Canada, Oct. 30, 1969,
66,256/69
Int. Cl. A23b 1/00
U.S. Cl. 99—194
17 Claims

ABSTRACT OF THE DISCLOSURE

A method and apparatus for forming a pre-shaped food product, particularly fish, and the pre-shaped food product produced thereby are described. The method includes the step of forming individual portions of the flesh, each being of predetermined size and being at least in a partially frozen condition, into a predetermined shape by forcing the flesh portions individually into a forming die cavity adapted to impart the predetermined shape to each portion. The volume of each portion prior to the forming step equals the volume of each corresponding formed food portion. The frozen pre-shaped edible flesh food product has a smoothly contoured marginal outline in plan view, with the flesh adjacent the marginal edge being in a deformed condition relative to the flesh in the central region of the product. The apparatus includes a forming station having a forming die all arranged to engage and form portions of flesh fed thereto. A device for feeding individual portions of the flesh to the forming station is provided as well as mechanism for effecting actuation of the feeding device and the forming die in timed relation to one another to effect forming of the flesh portions. The forming station includes a fixed platen with the feeding device being arranged to feed each flesh portion to a position intermediate the forming die and the platen when the die is in a retracted position. When the forming die is advanced the flesh portions are engaged in pressurized relation between the die and the platen. The feeding device includes an endless conveyor belt defining a path of travel which extends over the fixed platen and the conveyor belt is driven in step-by-step fashion to bring successive flesh portions intermediate the forming die and the fixed platen to permit them to be formed in sequential fashion. Ejecting means associated with the die for positively ejecting the formed flesh therefrom when the die is retracted are also provided.

This invention relates to a method and apparatus for forming a shaped food product, particularly fish, and to the shaped food product produced thereby.

In order to successfully market a product it is important that the product be prepared and processed in such a way that it has an attractive appearance insofar as the customer is concerned. Nowhere is this more true than in the food processing industry. Since most foods are sold today in self-service supermarkets it is more important than ever that the foodstuff, whatever its nature, be presented so as to have as much "eye appeal" to the customer as possible.

The present invention relates generally to the forming and shaping of an edible flesh food product to provide an attractive, marketable product. While the invention has particular reference to the manufacture of fish products, it is contemplated that other types of meat e.g. beef, pork, or mutton, could be processed in accordance with the principles of the present invention.

The prior art has provided various processes for forming and shaping meat products. In one prior art process, meat portions are placed in a mold and chilled to about the freezing point. The solidified, shaped meat is then removed and wrapped. In another prior art process, pieces of beef are cooled until they reach a semi-frozen condition. The meat is then ground while avoiding any substantial heating of the product and the ground semi-frozen material is formed into cakes by hand or by mold. These formed portions of meat are then frozen solid and wrapped. One notable disadvantage of the first prior art process mentioned above is that it is relatively slow; a considerable period of time is required to chill the meat portions to about the freezing point. An obvious disadvantage of the second process is that it requires the meat portions to be ground and thereafter formed into the required shape. The grinding step increases the costs considerably and, in addition, the complete disruption and reorientation of the grain of the meat caused by the grinding is objectionable in many cases.

It is a general object of the present invention to provide for the production of a shaped edible flesh food product which may be produced with a minimum amount of time and expense, wherein there is a minimal amount of distortion and reorientation of the grain of the flesh during the forming step, and wherein the completed product has a pleasing overall appearance making it eminently suitable for display in the frozen food section of a supermarket and for use in prepared entrees for institutional or catering establishments.

In accordance with one aspect of the present invention there is provided a method of making a preshaped edible flesh food product which includes the step of forming individual portions of the flesh, each being of predetermined size and being in a frozen condition, into a predetermined shape. In the preferred form of the invention each flesh portion is formed by forcing the latter individually into a forming die cavity having a volume corresponding substantially to that of said flesh portion and being adapted to impart the predetermined shape to each portion. Advantageously, the volume of each portion of predetermined size prior to the forming step, equals the volume of the formed food portion.

The method of the invention is capable of providing a frozen preshaped edible flesh food product which has an attractive smoothly contoured marginal outline when seen in plan view. In order to enhance the eye appeal of the product, the invention also provides for little, if any, deformation of the flesh in the central region of the product; most of the deformation of the flesh is found adjacent the marginal edge of the product.

The present invention provides, in a further aspect, an apparatus for forming a preshaped edible flesh product, which apparatus includes a forming station having a forming die all arranged to engage and form portions of flesh fed thereto. A device for feeding individual portions of the flesh to the forming station is provided together with mechanism for effecting actuation of the feeding device and the forming die in timed relation to one another to effect forming of the flesh portions. In the preferred form of the apparatus the forming station includes a fixed platen with the feeding device being arranged to feed each flesh portion to a position intermediate the forming die and the platen when the die is in a retracted position. When the forming die is advanced the flesh portions are engaged in pressurized relation between the die and the platen. The feeding device mentioned above preferably includes an endless conveyor belt defining a path of travel which extends over the fixed platen. The means for effecting actuation of the feeding means includes a mechanism for indexing the conveyor belt in step-by-step fashion to bring successive flesh portions intermediate the forming die and the fixed platen to permit them to be formed in sequential fashion.

The invention, in a further aspect, provides ejecting means associated with the die for positively ejecting the formed flesh therefrom when the die is retracted. Preferably, a web of synthetic plastics material is arranged such that it is interposed between the interior or cavity of the die and the flesh portion during the forming step and the web moved relative to the die cavity to effect ejection. In one form of the invention the web may be shifted forwardly relative to the die to effect ejection of the formed food portion.

The other features of the invention together with a fuller understanding thereof will be had from a reading of the following description of preferred embodiments of the invention read in conjunction with the drawings in which:

FIG. 2 is a cross sectional view of the forming station provided in the apparatus shown in FIG. 1;

FIGS. 3 and 4 are additional views illustrating the formation of a piece of edible flesh;

FIGS. 5 and 6 are a plan and elevation views respectively of the preshaped frozen flesh product of the present invention.

Figure 1:
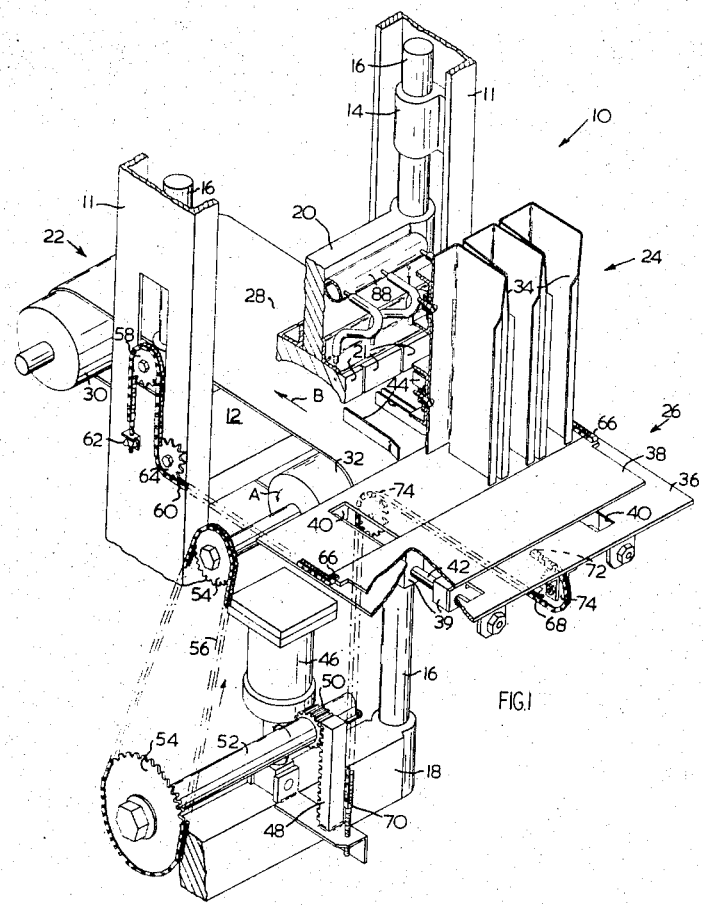
FIG. 1 is a pictorial representation of a press arrangement for forming frozen portions of meat with parts of the press being cut away to show the internal structure.

Although it is contemplated that the process of the present invention may be used with various kinds of meats, by far the greatest success to date has been achieved with the use of uncooked fish. Before describing the preferred form of apparatus for carrying out the process, the process will be described in general terms utilizing fish as the foodstuff.

The fresh fish is first frozen under pressure by any suitable prior art method and is then usually stored for any desired period of time. While still frozen, the fish is cut into regular shapes, the size of the portions being determined according to the weight desired. Generally speaking, each portion comprises a generally rectangular shape having length and width dimensions several times greater than the thickness dimension. The fish portions are then "tempered" that is, their temperatures are allowed to increase somewhat thereby to reduce the amount of pressure required to effect shaping of the frozen portions. Broadly speaking, the fish portions will be "tempered" until they have temperatures somewhere between about 10° F. and the upper limit of the freezing range for fish which is about 28.5° F. If the tempering temperature is too low, excessive damage to the flesh of the fish occurs during the forming step and the flavour of the final cooked product will be impaired. If the tempering temperature is too high, the portions will thaw out during the forming stage and may lose the shape imparted thereto and require re-freezing. At least reasonably good results can be achieved when the fish portions are "tempered" anywhere in the range from about 10° F. to roughly 25° F.; better results can be obtained if the tempering range is narrowed down to temperatures from about 15° F. to about 25° F., with optimum results being achieved about the middle of this range, that is, when the fish portions are at a temperature of about 20° F. just prior to the forming step.

The sub-divided portions of "tempered" fish are then fed individually to a forming station and are there pressed into a predetermined shape. The shape of the forming die will, of course, depend upon the final shape desired for the fish portion, and the pressure required to effect proper formation will depend upon the size of the portion and the temperature at which it is formed. For example, in order to effect formation of a portion of cod flesh weighing approximately 3½ ounces and "tempered" to about 20° F. roughly 600 lbs. pressure must be applied for each portion of fish.

After the portions have been formed to the required shape they are carried away from the forming station and are either refrigerated or are prepared for subsequent processing. Since the portions of the fish are still in a substantially frozen condition after the forming step they retain the shape imparted to them by the forming die.

The process and the product produced thereby will now be described more fully with reference being had to the drawings.

The apparatus shown in FIGS. 1 to 4 and designated generally by reference numeral 10 includes a suitable framework, only a portion of which is shown in FIG. 1, thereby to support the several components of the apparatus in the required relationship. The machine frame includes two upright support members 11. A fixed die member comprising a horizontal platen 12 extends therebetween and is rigidly connected thereto. Frame support members 11 include suitable guides 14 which serve to slidably support a pair of forming die actuator rods 16. Each actuator rod 16 is associated with a respective one of the frame members 11. Rods 16 extend vertically upwardly in spaced relation from a lower cross beam member 18 to which they are both rigidly connected.

Disposed above fixed platen 12 and rigidly interconnected to and extending between actuator rods 16 is a die head assembly 20. Die head assembly 20 includes a plurality of individual forming dies 21 disposed in side by side relationship across the width of the machine, each die 21 having its lower surface hollowed out so as to form a cavity of the desired size and shape. Those skilled in the art will realize that the die head assembly may be of unitary structure i.e. it may comprise a multi-cavity die.

It will be apparent from the above that as actuator rods 16 are shifted upwardly and downwardly, the die head assembly 20 is moved upwardly and downwardly in a vertical plane extending through the longitudinal axis of fixed platen 12.

In order to feed individual portions of fish to a position intermediate fixed platen 12 and forming die assembly 20, a feed assembly is provided which includes a belt conveyor assembly 22, a magazine storage assembly 24 and a feed table and feed plate assembly 26. Turning first to the belt conveyor assembly 22, it will be seen that there is provided an endless, generally horizontally disposed conveyor belt 28, the upper run of which passes directly over and in contact with the upper planar surface of fixed platen 12. Conveyor belt 28 extends about a pair of spaced parallel rollers 30 and 32 which are disposed on opposing sides of the fixed platen 12. Roll 30 is an idler roll while roll 32 is connected to suitable driving means which will be referred to hereinafter.

Magazine storage assembly 24 includes a series of magazines 34 disposed at the entrance to the conveyor belt immediately over and in spaced relation to a generally horizontally disposed feed table 36. The number of magazines 34 provided is equal to the number of individual forming dies 21 provided on the die head assembly 20. Mounted for reciprocation on feed table 36 is a feed plate 38. Feed plate 38 is secured to blocks 39 which extend downwardly through a pair of longitudinally extending parallel slots 40 provided in table 36 with blocks 39 being slidably mounted upon a pair of correspondingly spaced parallel guide rods 42. When feed plate 38 is in its rearmost position, the lowermost precut flesh portion in each of the magazines 34 drops downwardly onto the surface of feed table 36. Then, as feed plate 38 is advanced forwardly, the individual portions of fish are advanced forwardly onto the entrance end portion of the belt conveyor 22 and into positions intermediate spaced guide fingers 44 which are located at the entrance end of belt conveyor system 22. Guide fingers 44 serve to properly align and position the flesh portions just before they are moved to the required position by belt conveyor 22 between the forming dies 21 and the fixed platen 12.

In order to effect actuation of all of the above components, a hydraulic ram 46 is provided which is suitably rigidly connected to the machine frame. This hydraulic ram 46 is of the double acting variety and is connected via suitable valving means to a hydraulic pump and motor (not shown). When the apparatus 10 is in operation, the hydraulic ram effects up and down reciprocation of the lower cross beam member 18 with the result being that actuator rods 16 together with the die head assembly 20 connected therebetween are all reciprocated upwardly and downwardly in a vertical plane thereby to effect formation of and to shape the individual portions of fish as they are fed to their respective positions between the forming dies 21 and the fixed platen 12 by virtue of the actuation of the previously described belt conveyor assembly 22 and the feed table and feed plate assembly 26. In order that the conveyor belt 28 and the feed plate 38 may be driven in timed relation to the up and down movement of die head assembly 20, a toothed rack 48 is connected to lower cross beam 18. Rack 48 makes contact with a pinion 50 which is connected via one way clutch to shaft 52. Shaft 52 is connected via sprockets 54 and roller link chain 56 to the drive roll 32 of the belt conveyor assembly. The one-way clutch is so arranged that upon upward movement of cross beam 18 and die head assembly 20, drive roll 32 is rotated in the direction shown by arrow A with conveyor belt 28 being also indexed in the direction shown by arrow B. At the same time, the feed plate 38 is drawn towards the entrance end of the conveyor assembly due to the action of small sprockets 58 connected to opposing ends of die head assembly 20 which serve to increase the lengths of the roller link chains 60 contained in the bights of the chain which are drawn upwardly by sprockets 58 between points of connection 62 of chains 60 to the machine frame and further small sprockets 64 rotatably mounted on the machine frame as well. The opposing ends of chains 60 are connected to opposing ends 66 of feed plate 38; hence, as the die head assembly 20 is shifted upwardly, sprockets 58 are also moved upwardly thus increasing the length of the bights of chain contained between fixed ends 62 and sprockets 64 with the result being that the roller link chains 60 draw the feed plate 38 towards the entrance end of the conveyor assembly 22. In order to reverse the movement of feed plate 38 when the die head assembly is lowered, a further roller link chain 68 is provided with its one end secured to the cross beam assembly 18 at connection point 70 and its opposite end attached at 72 to the trailing edge of feed plate 38. Suitable guide sprockets 74 guide the roller link chain between the two points mentioned above in such a manner that when the cross beam 18 is lowered, the feed plate 38 is caused to move reardwardly.

It can be seen from the above description that as the hydraulic ram 46 effects lifting of the lower cross beam 18, the die head assembly 20 is raised upwardly. At the same time, the conveyor belt 28 is driven forwardly by one step i.e., indexed forwardly in the direction shown by arrow B. The movement of conveyor belt 28 is sufficient to bring a series of rectangular portions of fish from their respective positions intermediate the several pairs of guide fingers 44 to positions below respectively associated ones of the forming dies 21. Movement of the feed plate 38 forwardly simultaneously with the forward movement of the conveyor belt 28 due to the action of the previously described sprocket chain assemblies including roller link chain 60 takes place thereby to move a further series of fish pieces onto the entrance portion of the conveyor belt 28 in readiness for the next cycle of operation. When the hydraulic ram reverses its movement, the lower cross beam 18 is shifted downwardly together with the actuator rods 16 and die head assembly 20. At the same time feed plate 38 is shifted rearwardly as a result of the action of roller link chain 68. As the die head assembly moves downwardly, its forming dies 21 come into pressurized contact with respectively associated ones of the portions of fish that have been fed thereunder by the above described feed mechanism. This action is shown in FIGS. 3 and 4. It will be seen in FIG. 3 that the forming die (shown together with the feed assembly and platen as being in cross section) is positioned just above the rectangular portion of fish 80. From FIG. 4, it will be seen that the forming die 21 has been shifted downwardly so that it has come into pressurized engagement with the fish portion 80 thus effecting deformation of same, whereby the portion of fish conforms in shape to the shape of the die cavity within which the portion of fish is disposed. The lowermost surface of the portion of fish, of course, conforms to the flat surface of platen 12.

In order to effect rapid release of the formed fish portion from each forming die 21, several devices may be utilized.

FIG. 2 illustrates an arrangement for effecting rapid ejection of the formed product from the forming dies 21. A web of flexible sheet material 82 is disposed across the mouth of the cavity of each forming die 21. During the forming step, this web of flexible material is deformed upwardly and inwardly and it is thus interposed between the fish product and the interior of the die. In order to withstand the stresses involved during this operation the web of material 82 must be quite tough and resilient. Sheet polyethylene or Mylar film have been found to be quite satisfactory. The web of material 82 extends between supply and take-up rolls 84 disposed on opposing sides of die head assembly 20. Provision can be made for means to effect rotation of the take-up roll after a predetermined number of forming operations thereby to shift a length of the web 82 across the mouths of the forming die cavities before the web becomes sufficiently worn at any one point as to fail. During the ejection stage, a blast of compressed air may be blow into each forming die cavity between the interior surface of the forming die and the web of flexible material through passageways 86 which may be provided in each forming die 21. Passageways 86 are connected to a manifold 88 (see FIG. 1) which is connected to a source of pressurized air via a suitable valve (not shown) having actuating means thereon such that it is opened as the die head assembly 20 lifts upwardly to effect positive ejection of the formed pieces from the forming dies.

It has also been found by experiment that the web of material, if moved forwardly relative to the dies i.e. shifted across the mouths of the die cavities in step with the movement of conveyor belt 28, will act to eject the molded shapes from the dies. The web is arranged here to move towards the dispenser or magazine upon downward movement of the dies. In this alternative method, the application of air pressure for ejection of the formed portions is not required.

A formed portion of fish as produced by the method and apparatus described above is shown in FIGS. 5 and 6. FIG. 5 is a plan view while FIG. 6 shows the fish portion in elevation. From FIG. 5 it will be seen that the fish portion 90 has a smoothly contoured marginal outline 92 (i.e. fillet-shaped). It is preferred that the forming die cavity be arranged such that there is relatively little deformtion of the flesh of the fish in the central portion 94 of the formed portion. However, there is substantial flesh deformation adjacent the marginal edge 92 of the fish portion; this zone of deformation is illustrated by the dashed lines in FIG. 5 and by the shaded portions shown in FIG. 6. It will also be seen from FIGS. 5 and 6 that the upper major surface 95 of the formed portion is curved while the lower surface 96 is flat (due to the action of the flat platen 12). The central portion of the upper major surface 95 has a shallow convex curvature with the top surface 95 becoming much more sharply curved along the regions just inwardly of the marginal edge 92 of the formed product with such sharply curved surface directed toward the relatively flat bottom surface 96 of the product with the top and bottom surfaces intersecting all along the outermost marginal edge 92 of the product.

In order to produce the product described above, the dimensions of the subdivided portions of fish should be selected in accordance with the size and dimensions of the forming die cavities. The volume of each fish portion should correspond as closely as possible to the volume of each die cavity so that there will be no excess or "flash" produced during the forming step. In order to effect as little as possible deformation of the flesh in the central regions of the fish portions, the latter must be positioned accurately beneath the forming dies just before each forming step, and the longitudinal axis of the cut portion of fish should be approximately in alignment with the longitudinal or major axis of its associated forming die cavity.

After completion of the forming operation, the formed portions of fish may be placed back in refrigerated storage in a continuous freezer, or alternatively they may be taken directly to a packaging line.

Although the present invention has been described in its preferred form with a certain degree of particularity it is understood that the present disclosure of the preferred form has been made only by way of example and that numerous changes in the details of construction and mode of operation may be resorted to without departing from the spirit and the scope of the invention as hereinafter claimed.

I claim:

1. A method of producing a plurality of frozen edible flesh food products each having the same predetermined three dimensional shape, volume and weight, comprising:
    (a) subdividing a frozen piece of the flesh to produce a plurality of flesh portions, each said flesh portion having substantially the same predetermined volume,
    (b) placing at least one said flesh portion on an endless flexible belt at a feed station, which endless belt extends over a fixed die member, and
    (c) indexing said belt to advance said flesh portion from the feed station to a position over the fixed die member and in a location below a forming die and in alignment with a die cavity therein, said cavity having substantially the same volume as said flesh portion and having an internal shape adapted to impart thereto said predetermined three dimensional shape,
    (d) forming said flesh portion which has been advanced to said position by said belt by forcing said forming die downwardly toward said fixed die member to cause said flesh portion to be forced fully into said die cavity whereby to effect forming of said flesh portion to said predetermined three dimensional shape while said flesh portion is located on said belt at said position, each said flesh portion being in the frozen state during and after the forming step whereby the predetermined shape imparted to each portion is retained thereby,
    (e) raising said forming die, and,
    (f) ejecting said formed flesh portion from said die cavity such that the formed flesh portion, after ejection, rests on said belt, and
    (g) indexing said belt to carry the formed flesh portion away from the fixed die member while supported on said belt and to advance a further flesh portion which has been placed on said belt at the feed station toward said portion over said fixed die member, and repeating said forming, raising, ejecting, indexing and placing steps in a repetitive fashion to permit continuous production of the formed frozen edible flesh food products.

2. The method according to claim 1 wherein said indexing of said belt is effected as said forming die is raised to advance said flesh portion from the feed station toward said position over the die member and at the same time to carry an already formed flesh portion away from the die member.

3. The method of claim 1 wherein each said flesh portion is caused to pass between spaced guide fingers as it is advanced by said belt towards said location over said die member whereby to assist in effecting said alignment of each said flesh portion with said die cavity.

4. The method according to claim 1 wherein a web of flexible material is disposed across the mouth of the die cavity with such web being pushed upwardly into the die cavity during the forming step such that it lies between the flesh portion and the walls of the die cavity during the forming step, said step of ejecting the formed flesh portion including shifting the web across the mouth of the die cavity to eject the formed flesh portion from the die cavity.

5. The method of claim 1 wherein the fixed die member has a substantially flat surface over which said belt extends so that the belt portion overlying said fixed die member defines a flat forming surface, said forming die being brought into engagement with said belt during the forming step whereby to force the flesh portion fully into said die cavity, thereby to produce a formed flesh product having a flat lower surface with the upper surface portions thereof having a predetermined profile corresponding to the internal shape of the die cavity.

6. The method of claim 1 wherein said flesh comprises uncooked fish.

7. The method of claim 6 wherein the frozen fish is at a temperature not less than 10° F. just before the forming step.

8. The method of claim 1 wherein said die cavity is shaped to provide a fish-fillet shaped product.

9. A method for producing a plurality of frozen edible flesh food products each having the same predetermined three dimensional shape, volume and weight, comprising:
    (a) subdividing a frozen piece of the flesh to produce a plurality of flesh portions, each said flesh portion having substantially the same predetermined volume,
    (b) placing at least one said flesh portion on an endless flexible belt at a feed station, which endless belt has a run extending between upper and lower die members,
    (c) indexing said belt to advance said flesh portion from the feed station to a position over the lower one of said die members and in alignment with a die cavity in one of said die members, said cavity having substantially the same volume as said flesh portion and having an internal shape adapted to impart thereto said predetermined three dimensional shape,
    (d) forming said flesh portion which has been advanced to said position by said belt by bringing said die members together to cause said flesh portion to be forced fully into said die cavity whereby to effect forming of said flesh portion to said predetermined three dimensional shape while said flesh portion is located on said belt at said position, each said flesh portion being in the frozen state during and after the forming steps whereby the predetermined shape imparted to each portion is retained thereby,
    (e) separating said die members, and
    (f) ejecting said formed flesh portion from said die cavity such that the formed flesh portion, after ejection, rests on said belt, and
    (g) indexing said belt to carry the formed flesh portion away from said position while supported on said belt and to advance a further flesh portion which has been placed on said belt at the feed station towards said position over the lower die member, and repeating said forming, separating, ejecting, indexing and placing steps in a repetitive fashion to permit continuous production of the formed frozen edible flesh food products.

10. The method according to claim 9 wherein said indexing of said belt acts to advance said flesh portion from the feed station towards said position over the lower die member while at the same time carrying a formed flesh portion away from said lower die member.

11. A method of forming a shaped edible flesh food product comprising the steps of feeding individual portions of frozen flesh to a forming station and positioning each portion between a pair of die members and in alignment with a die cavity of predetermined shape and volume in one of said die members, across which die cavity a web of flexible material has been positioned, forcing each portion individually into said die cavity to form same to said predetermined shape by bringing said die members together whereby said web of flexible material is pushed into said cavity by said flesh portion during the forming step and lies between the cavity walls and the flesh portion and conforms intimately to the shape of the die cavity, separating said die members and moving said web across the mouth of said die cavity after said flesh has been formed to said predetermined shape to eject the formed flesh from the die cavity.

12. The method of claim 11 wherein the frozen flesh is carried to and through the forming station by a belt which moves in step by step indexing fashion and wherein said web is drawn across the mouth of said die cavity substantially in step with the indexing movement of the belt.

13. Apparatus for forming a shaped edible flesh food product comprising a forming station arranged to engage and form portions of frozen flesh fed thereto and including a die member and a forming die arranged for movement between a retracted position and a flesh engaging and forming position, an endless belt extending over said die member, means for disposing each frozen flesh portion on the surface of said belt in advance of said forming station, means for indexing said belt to bring each flesh portion to a location over said die member when the forming die is retracted, said means for disposing the flesh portions on said belt being adapted to place said flesh portions on said belt in timed relation to the indexing movement of said belt, means for bringing the forming die into a flesh engaging and forming position to form each flesh portion while the same is located on the belt surface over the die member, said belt indexing means being further arranged to cause said belt to carry each formed flesh portion away from the forming station after completion of the forming step, the apparatus being further characterized in that said forming die has a pluraliy of die cavities therein arranged in spaced apart relation laterally of the direction of movement of the belt, said means for disposing the frozen flesh on said belt being adapted to position on said belt a corresponding number of said flesh portions in a spaced relation across said endless belt corresponding to the spaced relation of said die cavities, a plurality of spaced guide means so arranged in relation to said belt that the flesh portions are caused to pass between said guide means as said portions are carried by said belt to said location over said die member, the guide means being adapted to assist in said positioining of each portion such that each portion enters into a respective one of the die cavities.

14. Apparatus according to claim 13 wherein said endless belt passes around a spaced pair of rolls to define upper and lower runs, and said fixed die member being located between said spaced rolls such that the upper run of said belt passes directly over said die member.

15. Apparatus according to claim 13 further including a plurality of magaiznes for storing said frozen portions of flesh, said magazines being arranged to cooperate with said means for disposing the frozen flesh on said belt to supply the latter with the individual frozen portions of the flesh.

16. Apparatus for forming a shaped edible flesh food product comprising a forming a station arranged to engage and form portions of frozen flesh fed thereto and including a die member and a forming die arranged for movement between a retracted position and a flesh engaging and forming position, an endless belt extending over said die member, means for disposing each frozen flesh portion on the surface of said belt in advance of said forming station, means for indexing said belt to bring each flesh portion to a location over said die member when the forming die is retracted, said means for disposing the flesh portions on said belt being adapted to place said flesh portions on said belt in timed relation to the indexing movement of said belt, means for bringing the forming die into a flesh engaging and forming position to form each flesh portion while the same is located on the belt surface over the die member, said belt indexing means being further arranged to cause said belt to carry each formed flesh portion away from the forming station after completion of the forming step, the apparatus being further characterized in that said forming die has a plurality of die cavities therein in spaced relation, said means for disposing the frozen flesh on said belt being adapted to position a corresponding number of said flesh portions in spaced relation on said endless belt such that during the forming step each flesh portion enters into a respective one of said die cavities and a web of flexible material non-adherent to said flesh supported over the mouths of said die cavities such that the web becomes sandwiched between the interior of each die cavity and the flesh portion during the forming step, and means for effecting movement of the web relative to the forming die at the end of the forming step to effect ejection of the formed flesh portions from said die cavity.

17. Apparatus for forming a shaped edible flesh food product comprising a forming station arranged to engage and form portions of frozen flesh fed thereto and including a die member and a forming die arranged for movement between a retracted position and a flesh engaging and forming position, an endless belt extending over said die member, means for disposing each frozen flesh portion on the surface of said belt in advance of said forming station, means for indexing said belt to bring each flesh portion to a location over said die member when the forming die is retracted, means for bringing the forming die into a flesh engaging and forming position to form each flesh portion while the same is located on the belt surface over the die member, said belt indexing means being further arranged to cause said belt to carry each formed flesh portion away from the forming station after completion of the forming step, said forming die having a forming cavity therein shaped to impart a desired shape to said flesh, and means for ejecting the formed flesh from said forming cavity upon retraction of said forming die whereby to deposit the formed flesh on the surface of said belt, said ejecting means including a web of flexible material non-adherent to said flesh supported over the mouth of said die cavity such that the web becomes sandwiched between the interior of the die cavity and the flesh portion during the forming step, and means for moving the web relative to the forming die at the end of the forming step to effect ejection of the formed flesh portions from the die cavity.

References Cited
UNITED STATES PATENTS

| | | | |
|---|---|---|---|
| 146,338 | 1/1874 | Herreshoff | 100—222 |
| 1,601,156 | 9/1926 | Adelmann | 100—DIG. 10 |
| 3,413,681 | 12/1968 | Manaster | 100—222 |
| 2,812,260 | 11/1957 | Keane et al. | 99—107 |
| 3,151,991 | 10/1964 | Evans et al. | 99—195 |
| 2,776,215 | 1/1957 | Thomas | 99—195 |
| 2,643,952 | 6/1953 | Crowther et al. | 99—195 |
| 3,529,976 | 9/1970 | Peters | 99—179 |
| 1,655,684 | 1/1928 | Troust | 18—5 |
| 3,253,929 | 5/1966 | Peters | 99—179 |

A. LOUIS MONACELL, Primary Examiner

R. M. ELLIOTT, Assistant Examiner

U.S. Cl. X.R.

99—195; 100—215, 218, 222; 425—256, 395, 397, 436